United States Patent
Zhao et al.

(10) Patent No.: US 9,667,505 B2
(45) Date of Patent: May 30, 2017

(54) URL NAVIGATION PAGE GENERATION METHOD, DEVICE AND PROGRAM

(71) Applicant: BEIJING QIHOO TECHNOLOGY COMPANY LIMITED, Beijing (CN)

(72) Inventors: Hongri Zhao, Beijing (CN); Xiaobin Zong, Beijing (CN); Weihua Tao, Beijing (CN)

(73) Assignee: BEIJING QIHOO TECHNOLOGY COMPANY LIMITED, Beijing (CN)

(*) Notice: Subject to any disclaimer, the term of this patent is extended or adjusted under 35 U.S.C. 154(b) by 318 days.

(21) Appl. No.: 14/346,074

(22) PCT Filed: Sep. 19, 2012

(86) PCT No.: PCT/CN2012/081617
§ 371 (c)(1),
(2) Date: Mar. 20, 2014

(87) PCT Pub. No.: WO2013/041022
PCT Pub. Date: Mar. 28, 2013

(65) Prior Publication Data
US 2014/0229601 A1 Aug. 14, 2014

(30) Foreign Application Priority Data

Sep. 22, 2011 (CN) ............ 2011 1 0284221
Sep. 22, 2011 (CN) ............ 2011 1 0284697

(51) Int. Cl.
*G06F 15/173* (2006.01)
*H04L 12/24* (2006.01)
*G06F 17/30* (2006.01)

(52) U.S. Cl.
CPC ........ *H04L 41/50* (2013.01); *G06F 17/30887* (2013.01)

(58) Field of Classification Search
CPC ............ H04L 41/50; G06F 17/30887
See application file for complete search history.

(56) References Cited

U.S. PATENT DOCUMENTS 8,600,968 B2 * 12/2013 Holenstein ........ G06F 17/30876
707/706
2005/0132296 A1 6/2005 Milic-Frayling et al.
(Continued)

FOREIGN PATENT DOCUMENTS

CN 1984115 A 6/2007
CN 101154224 A 4/2008
(Continued)

OTHER PUBLICATIONS

International Search Report regarding PCT/CN2012/081617, dated Dec. 13, 2012, four pages.
(Continued)

*Primary Examiner* — Yves Dalencourt
(74) *Attorney, Agent, or Firm* — Baker & Hostetler LLP

(57) ABSTRACT

The present invention discloses a method, device and program for generating a URL navigation page, and it relates to the field of network technologies. Based on a list of merged URLs, the present invention ranks the URLs visited by the user by a calculation method that uses the visit frequency as a standard to obtain the URLs most frequently visited by the user, then it puts the web sites represented by the top several URLs into specified positions to be displayed; the present invention also categories the URLs visited by the user according to a URL categorization rule, and then counts the frequency of visit to each category, and then designates corresponding display positions to the top categories in the rank according to the rank of the visit frequency, so that they can be displayed. By means of the present invention, the multiple categories of web sites most frequently visited by
(Continued)

the user can be provided to the user in a more objective, more accurate and more comprehensive manner.

14 Claims, 4 Drawing Sheets

(56) References Cited

U.S. PATENT DOCUMENTS

2010/0049688 A1* 2/2010 Matsumura ....... G06F 17/30887
706/52
2010/0070928 A1 3/2010 Goodger et al.

FOREIGN PATENT DOCUMENTS

| | | |
|---|---|---|
| CN | 101364231 A | 2/2009 |
| CN | 101551806 A | 10/2009 |
| CN | 101789995 A | 7/2010 |
| CN | 101860987 A | 10/2010 |
| CN | 101945234 A | 1/2011 |
| WO | WO 2007/056031 A1 | 5/2007 |
| WO | WO 2011/049641 A1 | 4/2011 |

OTHER PUBLICATIONS

CN101178728, English translation of abstract only, one page.
CN101860987, English translation of abstract only, one page.
CN101551806, English translation of abstract only, one page.
CN102332020A, English translation of abstract only, one page.
CN102354315A, English translation of abstract only, one page.
CN101789995A, English translation of abstract only, one page.

* cited by examiner

URL NAVIGATION PAGE GENERATION METHOD, DEVICE AND PROGRAM

FIELD OF THE INVENTION

The present invention relates to the field of network technologies, in particular to a method, device and program for generating a URL navigation page.

BACKGROUND OF THE INVENTION

With the development of networks, the number of web sites is becoming larger and larger, and users may visit multiple web sites. Each user has his own frequently-visited web sites, and it would be very inconvenient if the user has to re-enter the URLs of those web sites each time he tries to visit them.

In the prior art, a user may add the URLs of the web sites that he need to visit into the Favorites and then visit the web sites through the Favorites, but this requires the user to personally add the URLs into the Favorites, while the URLs frequently used by the user cannot be objectively displayed; or the user may visit some frequently visited URLs through a navigation web site, but the navigation web site only provides links to some well-known and frequently-visited web sites or some advertisement web sites, and it is quite possible that links to the URLs of the web sites that the user frequently visits are not provided therein; alternatively, the browser calculates the most frequently visited URLs on the basis of the number of times of visiting and the way of visiting, for example, each time a URL is visited, accumulating the corresponding weight number of times so as to calculate the final number of times of visiting. For example, the weight for visiting by directly entering URL is 2, and the weight for visiting through Favorites is 1, then after visiting baidu.com twice, the finally calculated result is 2+1=3. However, there are a lot of URLs that are only visited by the user once or several times in a day, so they cannot appear in the top of the list of the URLs visited and cannot be seen by the user. For example, a home page of news, a home page of a stock, or a community BBS might be visited once or several times in a day, or be visited once in two or three days, so such frequently visited URLs cannot be showed in the top of the list of most frequently visited URLs by simply calculating the number of times.

In addition, in the above-mentioned three ways, there may be the case in which some categories of web sites that the user needs to visit are not in the list of visiting, for example, the list of most frequently visited web sites shows only nine web sites, but after ranking the URLs to show them, it is possible that two categories of web sites have occupied all positions in the list, if there are also other categories of web sites that are less frequently visited by the user, then the user cannot visit said categories of web sites in the list of most frequently visited web sites.

In light of the above, the URL navigation page in the prior art still has deficiencies in providing the users with information of the most frequently visited web sites.

SUMMARY OF THE INVENTION

In view of the above problem, the present invention is put forward to provide a URL navigation page generation method and a corresponding URL navigation page generation device and program that can overcome the above-mentioned deficiencies or at least partly solve the alleviate the above-mentioned problem.

According to one aspect of the present invention, a method for generating a URL navigation page is provided, which comprises:

a data obtaining step for obtaining a user's URL browsing record;

a counting step for counting the frequency of visit to each URL according to said record;

a ranking step for ranking each of the URLs based on the counted frequency of visit to each URL by the user;

a URL displaying step for putting the top several URLs in specified positions to be displayed.

Accordingly, the present invention also provides a device for generating a URL navigation page, which comprises:

a data obtaining module, adapted to obtaining a user's URL browsing record;

a counting module, adapted to counting the frequency of visit to each URL according to said record;

a ranking module, adapted to ranking each of the URLs based on the counted frequency of visit to each URL by the user;

a URL displaying module, adapted to putting the top several URLs in the rank in specified positions to be displayed.

According to another aspect of the present invention, a method for generating a URL navigation page is provided, which comprises:

a data obtaining step for obtaining a user's URL browsing record;

a categorizing step for categorizing the URLs in said record according to a URL categorization rule;

a counting step for counting the frequency of visit to each category of URLs according to said record;

a ranking step for ranking each of the categories of URLs based on the counted frequency of visit to each category of URLs by the user;

a position designating step for selecting URLs of the top several categories of URLs and designating them into specified positions;

a URL displaying step for selecting, according to a rule, URLs in each category of URLs to which positions have been designated and putting them in corresponding positions to be displayed.

Accordingly, the present invention also provides a device for generating a URL navigation page, which comprises:

a data obtaining module, adapted to obtaining a user's URL browsing record;

a categorizing module, adapted to categorizing the URLs in said record according to a URL categorization rule;

a counting module, adapted to counting the frequency of visit to each category of URLs according to said record;

a ranking module, adapted to ranking each of the categories of URLs based on the counted frequency of visit to each category of URLs by the user;

a position designating module, adapted to selecting URLs of the top several categories of URLs and designating them into specified positions;

a URL displaying module, adapted to selecting, according to a categorization rule, URLs in each category of URLs to which positions have been designated and putting them in corresponding positions to be displayed.

According to still another aspect of the present invention, a computer program is provided, which comprise a computer readable code, and running of said computer readable code on a user terminal causes said user terminal to carry out the method for generating a URL navigation page.

According to yet another aspect of the present invention, a computer readable medium is provided, which stores the computer program.

The advantageous effects of the present invention are as follows:

1) Based on a list of merged URLs, URLs visited by the user are ranked by a calculation method that uses the visit frequency as a standard, and the URLs most frequently visited by the user are obtained, then the web sites represented by the top several URLs are put into specified positions to be displayed, thus the URLs most frequently visited by the user can be provided to the user in a more objective, more accurate and more comprehensive manner.

2) The URLs visited by the user are categorized first according to a URL categorization rule, then the frequency of visit to each category is counted, next the top categories are designated with corresponding display positions to be displayed according to the rank of the frequency of visit, thus the multiple categories of web sites most frequently visited by the user can be provided to the user in a more objective, more accurate and more comprehensive manner.

The above description is only a summary of the technical solution of the present invention, in order to facilitate a clearer understanding of the technical means of the present invention so as to enable implementation thereof based on the contents of this specification, and in order to make the above-mentioned and other objects, characteristics and advantages of the present invention clearer and more easily understood, specific embodiments of the present invention are given below.

BRIEF DESCRIPTION OF THE DRAWINGS

By reading the detailed descriptions of the preferred embodiments given below, various other advantages and benefits will become clear to those ordinarily skilled in the art. The figures are only for the purpose of illustrating the preferred embodiments, but they are not considered limiting the present invention. Throughout the figures, like reference signs indicate like components.

In the figures.

DETAILED DESCRIPTION OF THE INVENTION

The present invention is described in further detail below in conjunction with the figures and the specific embodiments.

Figure 1:
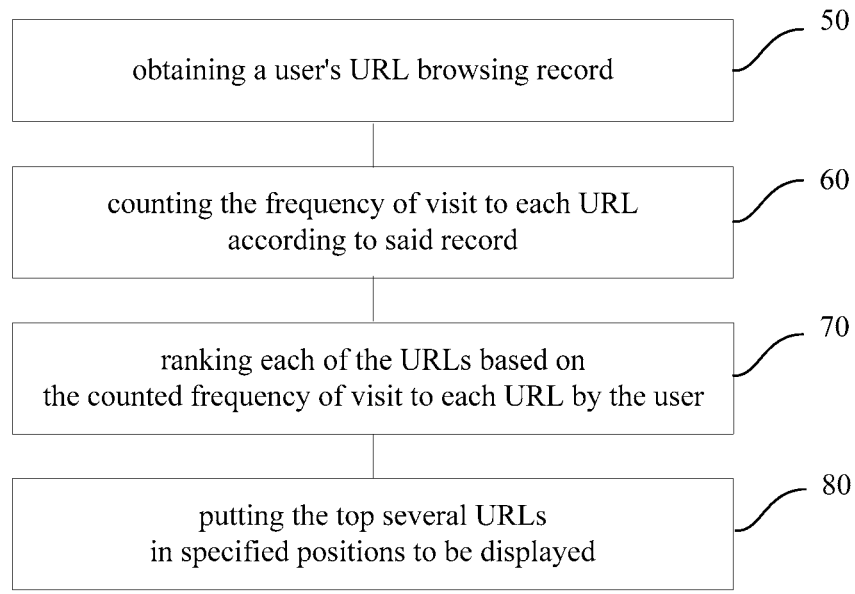
FIG. 1 is a flow chart of a first embodiment of the method for generating a URL navigation page according to the present invention.

Referring to FIG. 1, which shows a flow chart of a first embodiment of the method for generating a URL navigation page according to the present invention, said method comprises:

a data obtaining step 50 for obtaining a user's URL browsing record.

When the user opens a browser, the present invention can obtain the user's URL browsing record in the browsing history record, and then calculate the URLs that are most frequently visited by the user. Usually, the pre-set calculated number is more than the number of display in the specified positions. For example, when the user opens the browser everyday, the browsing record of the last 10 days are obtained from the browsing history record to calculate the most frequently visited 30 URLs, while the specified positions display the top nine by default.

For example, generally all history records are stored in the user directory, e.g. C:\Users\user name\AppData\Roaming\360se\data\history.dat in Win7, and they exist in the form of customized database.

A counting step 60 for counting the frequency of visit to each URL according to said record.

Wherein said step further includes a step A1: counting the number of times of visiting and/or the way of visiting each URL according to said record.

With respect to the obtained URL browsing record mentioned above, the frequency of visit to each URL is counted. Wherein, said frequency is: for all visits to a URL made by a user within a certain period of time, the frequency is recorded as a certain value. For example, said frequency is as follows: when the user visits a URL within a certain period of time, then the frequency is recorded as 1; when the user does not visit a URL within a certain period of time, then the frequency is recorded as 0. Another example is given on a day basis, no matter how many times a URL is visited within one day, the frequency of the merged URL records is recorded as 1, if relevant URLs of said URL are not visited in that day, the frequency of the merged URL records is recorded as 0. Of course, the frequency may be counted in a similar way on a basis of 12 hours, 6 hours, etc., as long as the time spans a certain range.

The number of times of visiting a URL, the way of visiting a URL and the like may be calculated.

A ranking step 70 for ranking each of the URLs based on the counted frequency of visit to each URL by the user.

Wherein, said step further includes step A2: ranking the URLs according to the counted number of times of visiting each of the URLs and/or way of visiting each of the URLs.

Wherein, when a plurality of URLs have the same frequency of visit, they may be ranked again by the number of times of visiting and/or the way of visiting. Wherein, a priority may be set for comparison between the number of times of visiting and the way of visiting so as to determine which one is to be used in preference as the keyword for ranking. For example, if URL A and URL B have the same frequency of visit, but the number of times of visiting URL A is greater than that of URL B, then URL A will be in front of URL B; if URL A and URL B have the same frequency of visit and the same number of times of visit, then they are ranked according to the way of visiting, wherein, different priorities can be given to different ways of visiting, for example, the number of times of visit by directly entering the URL is compared first, and if there are still parallel URLs after making this comparison, then the number of times of visit by the Favorites is compared, etc.

A URL displaying step 80 for putting the top several URLs in specified positions to be displayed.

Preferably, the top several URLs are respectively put into the plurality of positions in the tab page according to the rank. For example, a newly opened blank page is used as the tab page, then said tab page is divided into nine blocks (i.e. nine positions), each block being filled with a URL most frequently visited by the user. When a rank of the URLs is obtained through the previously described steps, the top nine URLs can be taken to be put into these nine display positions. Wherein the sequence of putting of said top nine URLs can be pre-set, for example, starting from the first row in the top and from top left to lower right, or starting from the first row in the left and from top to bottom, or the nine blocks can be numbered so as to put according to the number. Wherein a preview of the URLs can be given during the display, or the directories of the main URL that is ranked on the top as well as the sub-URLs of said main URL that have been visited by the user can be put into specified positions to be displayed by means of directory exhibition.

Alternatively, a tab bar is added in a certain starting web page, and the top-ranked URLs are displayed in sequence in this tab bar.

In addition, following said step 70, there is also:

a URL deleting step for deleting blacklist URLs among the ranked URLs according to a blacklist. Generally speaking, if the user deletes a URL from the display page, the engine will add this URL into the blacklist, and in the subsequently obtained list of rank of the URLs that are most frequently visited by the user, if said URL appears, it will be deleted from the rank, and the URL following it will be promoted.

There is also a blacklist removing step, wherein for URLs in the backlist set by the user, if the frequency of visit to a certain URL by the user exceeds a threshold within a period of time, then said URL will be deleted from the blacklist.

For a URL in the blacklist, if the user frequently visits it within a certain period of time (e.g. 10 days), the engine will make a judgment, if the frequency of visit to said URL by the user within a certain period of time exceeds a threshold, said URL will be deleted from the blacklist, and if it has a top rank and meets the requirement, it may be put in a specified position to be displayed.

A URL visiting record in 7 days is shown in Table 1 below to illustrate this embodiment.

TABLE 1

| | Day 1 | Day 2 | Day 3 | Day 4 | Day 5 | Day 6 | Day 7 |
|---|---|---|---|---|---|---|---|
| Web site A | once | once | once | once | once | once | once |
| Web site B | 4 times | 4 times | | | 4 times | 4 times | 4 times |
| Web site C | twice | twice | twice | | | | |
| Web site D | | | | | 100 times | | |

There are 4 URLs A, B, C and D currently,

URL A has been visited only once every day in the past week, but it is visited every day in the week;

URL B has been visited in five days in the past week, four times each day;

URL C has been visited in three days in the past week, twice each day;

URL D has been only visited in one day in the past week, but for 100 times.

When using the user's visit frequency as a standard for calculating, if visit to a URL is made once by the user each day, 1 point is given to said URL.

Each URL has a corresponding F value (frequency).

Then the number of times of visiting each URL is accumulated to obtain a C value (count).

the F of URL A is 1+1+1+1+1+1+1=7 F=7
the F of URL B is 1+1+1+0+1+1+1=5 F=5
the F of URL C is 1+1+1+0+0+0+0=3 F=3
the F of URL D is 0+0+0+0+1+0+0=1 F=1 so the final rank is A B C D.

Finally, the top ones in the rank are put into specified positions.

Figure 2:
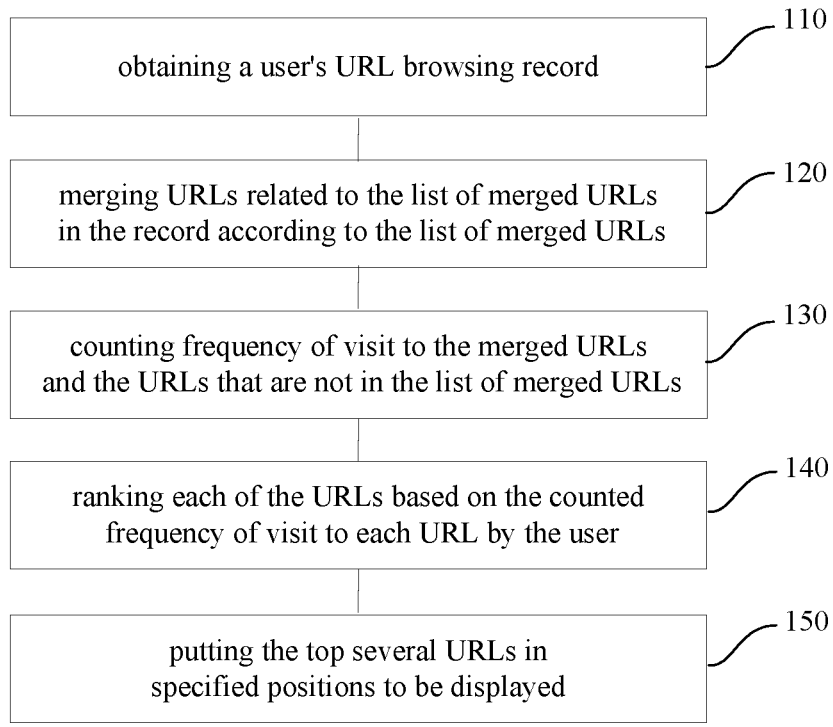
FIG. 2 is a flow chart of a second embodiment of the method for generating a URL navigation page according to the present invention.

Referring to FIG. 2, which shows a flow chart of a second embodiment of the method for generating a URL navigation page according to the present invention, said method comprises:

a data obtaining step 110 for obtaining the user's URL browsing record;

a URL merging step 120 for merging URLs related to the list of merged URLs in said record according to the list of merged URLs.

After obtaining the user's URL browsing record, with respect to URLs related to the list of merged URLs in said record, records of subordinate URLs that belong to the same URL in the list of merged URLs in said URL browsing record are merged under the URLs in the list of merged URLs to which they belong.

For example, in order to avoid counting of weibo.com and weibo.com/atme respectively, weibo.com/atme is merged into weibo.com to be counted. By means of the mechanism of the list of merged URLs, weibo.com/atme is merged into weibo.com, thus when the user visits weibo.com/atme, the count for weibo.com increments, and the list of URLs is automatically installed into the user's computer together with the browser installation file, and the list file will be kept up to date as the browser upgrades.

Said list of merged URLs can be manually set or be set through intelligent learning. For example, for a well-known portal URL, such as Netease, both the URL of the home page of Netease and the URL of Netease News can be put into the list of merged URLs according to experience, if the URL of Netease News and its sub-links are directly visited instead of visiting the URL of Netease News through links to URLs on the homepage of Netease, then said visiting records will be merged under the visit to the URL of Netease News, if the URL of Netease News and its sub-links are not directly visited, then said visiting records will be merged under the visit to the Netease home page, as for other cases, they can be handled according to the similar rule. Alternatively, if a certain URL is very frequently visited, then it will be added into the list of merged URLs, for example, initially the URLs relating to Netease included in the list of merged URLs only include the URL of the Netease home page, and all visiting records relating to Netease will be merged into the URL of the Netease home page, but when the frequency of a user directly visiting the URL of Netease News is greatly higher than the frequency of visiting the Netease home page, then the engine will add the Netease News into the list of merged URLs through intelligent learning, so that all records of directly visiting Netease News will be merged under the URL of Netease News.

A counting step 130 for counting the frequency of visit to merged URLs and URLs that are not in the list of merged URLs.

With respect to the obtained merged URL browsing records as mentioned in the above, the frequency of visit to said merged URLs by the user is counted, for URLs in the list of merged URLs, the frequency of visiting said URLs are directly counted. Wherein, said frequency is as follows: when the user visits a URL within a certain period of time, the frequency is recorded as 1; when the user does not visit a URL within a certain period of time, then the frequency is recorded as 0. An example is given on a day basis, no matter how many times a URL is visited within one day, the frequency of the merged URL records is recorded as 1, if relevant URLs of said URL are not visited in that day, the frequency of the merged URL is recorded as 0. Of course, the frequency may be counted in a similar way on a basis of 12 hours, 6 hours, etc., as long as the time spans a certain range.

A ranking step 140 for ranking each of the URLs based on the counted frequency of visit to each URL by the user.

After obtaining the frequency of visit to each of the URLs in the above-mentioned step, the URLs can be ranked according to said counted frequency.

Wherein, when a plurality of URLs have the same frequency of visit, they may be ranked again by the number of times of visiting and/or the way of visiting. Wherein, a priority may be set for comparison between the number of times of visiting and the way of visiting so as to determine which one is to be used in preference as the keyword for ranking. For example, if URL A and URL B have the same frequency of visit, but the number of times of visiting URL A is greater than that of URL B, then URL A will be in front of URL B; if URL A and URL B have the same frequency of visit and the same number of times of visit, then they are ranked according to the way of visiting, wherein, different priorities can be given to different ways of visiting, for example, the number of times of visiting by directly entering the URL is compared first, and if there are still parallel URLs after making this comparison, then the number of times of visiting by the Favorites is compared, etc.

A URL displaying step 150 for putting the top several URLs in the rank into specified positions to be displayed.

In addition, following said ranking step 140, there is also a URL deleting step for deleting blacklist URLs among the ranked URLs according to a blacklist, and a blacklist removing step, wherein for URLs in the backlist set by the user, if the frequency of visit to a certain URL by the user exceeds a threshold within a period of time, then said URL will be deleted from the blacklist.

A URL browsing record in 7 days is shown in Table 2 below to illustrate this embodiment.

TABLE 2

|  | Day 1 | Day 2 | Day 3 | Day 4 | Day 5 | Day 6 | Day 7 |
|---|---|---|---|---|---|---|---|
| Web site A | once | once | once | once | once | once | once |
| Web site B | 4 times | 4 times |  |  | 4 times | 4 times | 4 times |
| Web site C |  |  | twice | twice |  |  |  |
| Web site C1 | twice | twice |  |  |  |  |  |
| Web site D |  |  |  |  | 100 times |  |  |

There are 4 URLs A, B, C, C1 and D currently (wherein C1 is a sub-URL of C),
URL A has been visited only once every day in the past week, but it has been visited every day in the week;
URL B has been visited in five days in the past week, four times each day;
URL C has been visited in two days in the past week, twice each day;
URL C1 is a sub-URL of URL C, which has been visited in two days in the past week, twice each day;
URL D has only been visited in one day in the past week, but for 100 times.

In the list of merged URLs, there are URL A, URL B, URL C and URL D.

Thus record of URL C1 needs to be merged under the record of URL C, in this case, URL C is visited in four days in the past week, four times each day.

When using the user's visit frequency as a standard for calculating, if a visit to a URL is made once by the user each day, 1 point is given to said URL, Each URL has a corresponding frequency, i.e. F value (frequency).

the F of URL A is $1+1+1+1+1+1+1=7$ F=7
the F of URL B is $1+1+0+0+1+1+1=5$ F=5
the F of URL C is $1+1+1+1+0+0+0=5$ F=4
the F of URL D is $0+0+0+0+1+0+0=1$ F=1 although URL D has been visited 100 times in a week, while URL A has only been visited 7 times in a week, the final rank is A B C D, then the top ones in the rank are put into specified positioned to be displayed.

Table 3 shows an example in which URLs having the same visit frequency are ranked according to the number of times of visit to the URLs.

TABLE 3

|  | Day 1 | Day 2 | Day 3 | Day 4 | Day 5 | Day 6 | Day 7 |
|---|---|---|---|---|---|---|---|
| Web site A | once | once | once | once | once | once | once |
| Web site B | 4 times | 4 times |  |  | 4 times | 4 times | 4 times |
| Web site C |  |  | twice | twice | twice |  |  |
| Web site C1 | twice | twice |  |  |  |  |  |
| Web site D |  |  |  |  | 100 times |  |  |

There are 4 URLs A, B, C, C1 and D currently (wherein C1 is a sub-URL of C),
URL A has been visited only once every day in the past week, but it has been visited every day in the week;
URL B has been visited in five days in the past week, four times each day;
URL C has been visited in two days in the past week, twice each day;
URL C1 is a sub-URL of URL C, which has been visited in two days in the past week, twice each day;
URL D has only been visited in one day in the past week, but for 100 times.

In the list of merged URLs, there are URL A, URL B, URL C and URL D.

Thus record of URL C1 needs to be merged under the record of URL C, in this case, URL C is visited in four days in the past week, four times each day When using the user's visit frequency as a standard for calculating, if a visit to a URL is made once by the user each day, 1 point is given to said URL, then the number of times of visit to each URL is accumulated to obtain a C value (count).

the F of URL A is $1+1+1+1+1+1+1=7$ F=7, and the C of URL A is $1+1+1+1+1+1+1=7$ C=7
the F of URL B is $1+1+0+0+1+1+1=5$ F=5, and the C of URL B is $4+4+0+0+4+4+4=5$ C=20
the F of URL C is $1+1+1+1+0+0+0=5$ F=5, and the C of URL C is $2+2+0+0+2+2+2=5$ C=10
the F of URL D is $0+0+0+0+1+0+0=1$ F=0, and the C of URL D is $0+0+0+0+100+0+0=1$ C=100 although URL D has been visited 100 times in a week, while URL A has only been visited 7 times in a week, the F value of A is greater than that of B, C and D, URL B and URL C have the same F value, but URL B has a greater C value than URL C, so the final rank is still A B C D.

Wherein, when multiple URLs have the same visit frequency, if the number of times of visit is given a higher preference for ranking, and the way of visit is given a lower preference for ranking, when multiple URLs have the same frequency of user visit and the same number of times of visit, then said multiple URLs are ranked according to the ways of visit to each of said counted URLs. Wherein the ways of ranking include, for example, directly entering in the address bar, visiting through the Favorites, and opening by clicking a link on the page. When multiple URLs have the same user visit frequency and the same number of times of visit, for example, the ranking may be performed first by counting the way of directly entering in the address bar, or the ranking may be performed by counting the way of visiting through the Favorites, or the ranking may be performed by counting the way of opening by clicking a link on the page. Moreover, for example, when multiple URLs have the same user visit frequency, the same number of times of visit and the same number of times of visiting by directly entering in the address bar, then the ranking may be performed by counting the way of visiting through the Favorites Ranking in other situations can be performed according to the similar principle. Priorities may be given to different ways of visiting, for example, the ranking is performed first by the number of times of visiting made through directly entering in the address bar, if there are still the same, the ranking is then performed by the number of times of visiting made through the Favorites, if there are still the same, the ranking is then performed by the number of times of visiting through opening by clicking a link on the page.

Figure 3:
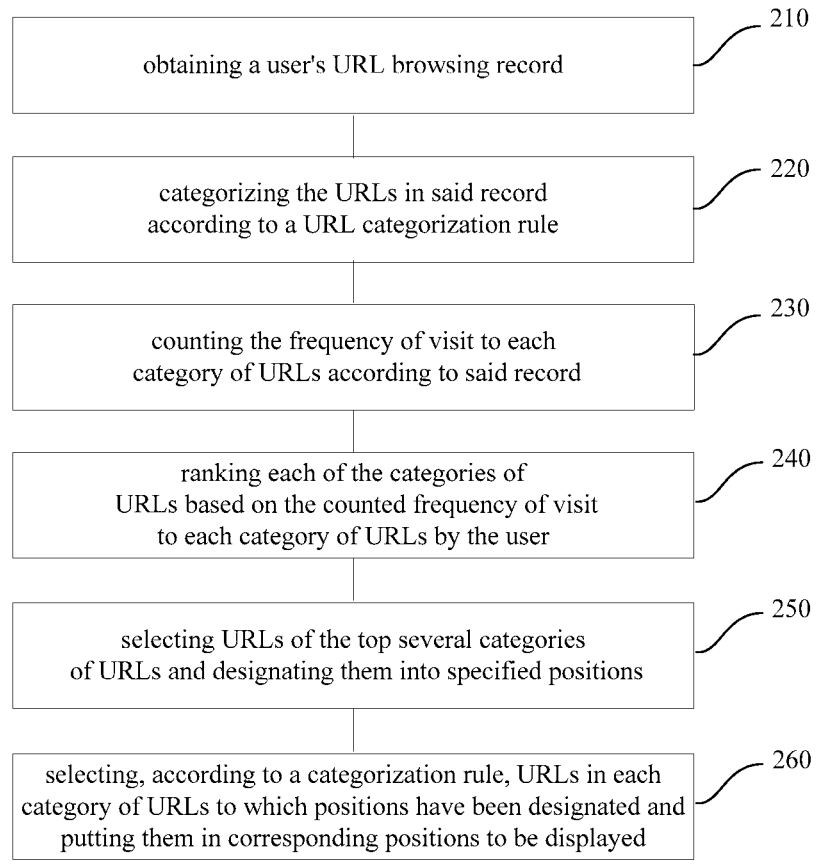
FIG. 3 is a flow chart of a third embodiment of the method for generating a URL navigation page according to the present invention.

FIG. 3 is a flow chart of a third embodiment of the method for generating a URL navigation page according to the present invention, said method comprises:

a data obtaining step 210 for obtaining the user's URL browsing record;

a categorizing step 220 for categorizing URLs in said record according to a URL categorization rule.

For example, the categories of the URLs can be pre-set to include sports, music, movies and television, news, games, etc., then the obtained URLs browsed by the user are categorized into these categories according to a certain rule. For example, for the URLs in the user's URL browsing record, a collection of keywords of a URL is counted first, then it is matched to a collection of keywords of a category of URLs that has been categorized to see the similarity, if the similarity exceeds a threshold, then said URL belongs to said category of URLs.

Following said categorizing step, there is also a URL merging step for merging URLs related to the list of merged URLs in each category of URLs according to the list of merged URLs. The specific step of merging and the list of merged URLs may be the same as the descriptions and examples about URL merging in the second embodiment of the method for generating a URL navigation page of the present invention.

A counting step 230 for counting the frequency of visit to each category of URLs according to said record.

Said counting step includes:

step S1: counting the frequency of visit to each URL according to said record;

wherein said step may further counting the number of times of visiting and/or the way of visiting each URL according to said record.

With respect to the obtained URL browsing record as mentioned above, the frequency of visit to each URL is counted. Wherein said frequency is: for all visits to a URL made by a user within a certain period of time, the frequency is recorded as a certain value. For example, said frequency is as follows: when the user visits a URL within a certain period of time, then the frequency is recorded as 1; when the user does not visit a URL within a certain period of time, then the frequency is recorded as 0. Another example is given on a day basis, no matter how many times a URL is visited within one day, the frequency of the merged URL records is recorded as 1, if relevant URLs of said URL are not visited in that day, the frequency of the merged URL records is recorded as 0. Of course, the frequency may be counted in a similar way on a basis of 12 hours, 6 hours, etc., as long as the time spans a certain range. Alternatively, the number of times of visiting and the way of visiting a URL may be counted.

Step S2: accumulating the frequency of visit to URLs in each category according to the visit frequency of each URL to obtain a total visit frequency of each category.

The visit frequency of all URLs in the same category of URLs are accumulated to obtain the visit frequency of said category of URLs, for example, the frequency of visit to a sports web site A by a user is 4 within a certain period of time, and the frequency of visit to a web site B of this category is 5, then the frequency of visit to the sports category by said user is 9. In this way, the visit frequency of each category of URLs is counted.

In addition, the visit frequency of each category of URLs and the number of times of each way of visiting can be finally counted according to the previously described counting of the number of times of visiting and the way of visiting the URLs.

A ranking step 240 for ranking each of the categories of web sites according to the counted frequency of visit to each of the categories of URLs by the user.

For example, the frequency of visit to the sports category by the user is 50, the frequency of visit to the music category is 28, the frequency of visit to the movies and television category is 90, then the categories may be ranked as follows: movies and television category, sports category, music category.

A position designating step 250 for selecting URLs of the top categories of URLs in the rank and designating them into specified positions.

Wherein, preferably, according to the result of ranking of the URL categories, each of the top categories of URLs in the rank may be designated with a position in the tab page.

For example, a newly opened blank page is used as the tab page, then said tab page is divided into nine blocks (i.e. nine positions), each block corresponding to a category of URLs. When a rank of the URLs is obtained through the previously described steps, the top nine categories of URLs in the rank can be taken to be designated into these nine display positions. Wherein the sequence of designating of said top nine categories of URLs can be pre-set, for example, starting from the first row in the top and from top left to lower right, or starting from the first row in the left and from top to bottom, or the nine blocks can be numbered so as to put according to the number. Alternatively, a tab bar is added in a certain starting web page, and the top categories of URLs in the rank are designated in sequence into a plurality of positions in this tab bar.

Alternatively, based on the proportion of the visit frequency of each category of URLs, a plurality of positions may be designated correspondingly in the tab page according to a rule.

For example, a newly opened blank page is used as the tab page, then said tab page is divided into nine blocks (i.e. nine positions), each block corresponding to a category of URLs. For the top categories of URLs in the rank, if the visit frequency of the first category in the rank has a proportion of more than 50% of the total visit frequency, more positions, e.g. 4 positions, will be designated to said category, and the visit frequency of the second category in the rank takes a proportion of 20%, so 2 positions are designated thereto, and the visit frequency of the third category in the rank takes a proportion of 15%, so 1 position is designated thereto, and the visit frequency of the fourth category in the rank takes a proportion of 8%, so 1 position is designated thereto, and then the visit frequency of the fifth category in the rank takes a proportion of 5%, so 1 position is designated thereto. Alternatively, a tab bar is added in a certain starting web page, and the top categories of URLs in the rank are designated into a plurality of positions in this tab bar according to said proportions.

A URL displaying step 260 for selecting, according to a rule, URLs in each category of URLs to which positions have been designated and putting them in corresponding positions to be displayed.

Preferably, for each of said categories of URLs, according to a rank of the visit frequency of each of the URLs in said categories of URLs, the top one or several in the rank are put into corresponding positions to be displayed.

Wherein, said step further includes step A1: counting the number of times of visiting and/or the way of visiting each URL according to said record;

step A2: ranking the URLs according to the counted number of times of visiting and/or way of visiting each of the URLs.

Specifically, with respect to the counting of the URL visit frequency in this embodiment, it may be the same as the example described in conjunction with table 2 in the second embodiment; with respect to the case in which multiple URLs have the same visit frequency, the URLs having the same visit frequency are ranked according to the number of times of visiting the URLs, and it also may be the same as the example described in conjunction with table 3 in the second embodiment; with respect to the case in which multiple URLs have the same user visit frequency and the same number of times of visit, said multiple URLs are ranked according to the counted way of visiting each of said multiple URLs, and it also may be the same as the example described in the second embodiment.

Further, after ranking according to the visit frequency of each URL in said categories of URLs, there is also:

a URL deleting step for deleting blacklist URLs among the ranked URLs according to a blacklist. Generally speaking, if the user deletes a URL from the display page, the engine will add this URL into the blacklist, and in the subsequently obtained list of rank of the URLs that are most frequently visited by the user, if said URL appears, it will be deleted from the ranking, and the URLs following it will be promoted.

There is also a blacklist removing step, wherein for URLs in the backlist set by the user, if the frequency of visit to a certain URL by the user exceeds a threshold within a period of time, then said URL will be deleted from the blacklist.

For a URL that is in the blacklist, if the user frequently visits it within a certain period of time (e.g. 10 days), the engine will make a judgment, if the frequency of visit to said URL by the user within a certain period of time exceeds a threshold, said URL will be deleted from the blacklist, and if it has a top rank and meets the requirement, it may be put in a specified position to be displayed.

Besides, URLs that are most frequently visited by all clients in the corresponding category of URLs in each of the positions can be directly displayed.

In addition, following said counting step, there is also a step of updating the list of merged URLs, wherein when the visit frequency of a URL exceeds a threshold, said URL is added into the list of merged URLs.

In addition, the present invention further includes a category adding step, wherein a total frequency of visit to URLs related to an event by all clients exceeds a threshold, said event is added into the categorization rule as a new category.

When a certain event has attracted huge interest within a certain period of time on the Internet, and a lot of clients frequently browse web pages related to said event on various web sites. For example, for web pages related to the "2008 Beijing Olympics", the frequency of visit to said event by all terminals exceeds a threshold, then web pages related to the "2008 Beijing Olympics" will be put into a separate category, and according to said category, web pages related to said event in the user's URL browsing record will be categorized into said category.

Figure 4:
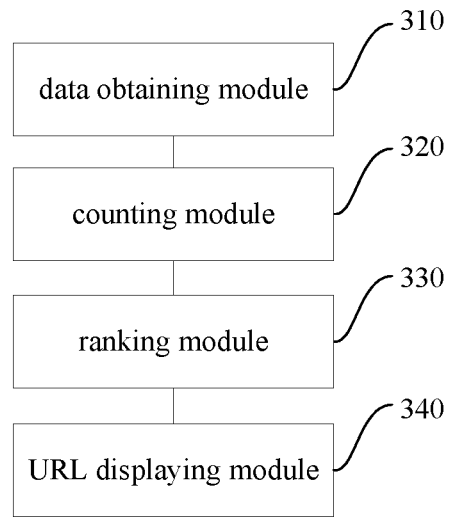
FIG. 4 is a structural diagram of a first embodiment of the device for generating a URL navigation page according to the present invention.

FIG. 4 is a structural diagram of a first embodiment of the device for generating a URL navigation page according to the present invention, said device comprises:

a data obtaining module 310 adapted to obtaining a user's URL browsing record;

a counting module 320 adapted to counting the frequency of visit to each URL according to said record;

a ranking module 330 adapted to ranking each of the URLs based on the counted frequency of visit to each URL by the user;

a URL displaying module 340 adapted to putting the top several URLs in the rank in specified positions to be displayed.

Wherein, before said URL displaying module, there are also:

a counting sub-module adapted to counting the number of times of visiting and/or the way of visiting each URL according to said record;

a ranking sub-module adapted to ranking multiple URLs according to the counted number of times of visiting and/or the way of visiting each of said multiple URLs.

After said ranking module, there are also:

a URL deleting module adapted to deleting blacklist URLs among the ranked URLs according to a blacklist, and a blacklist removing module adapted to for URLs in the backlist set by the user, if the frequency of visit to a certain URL by the user exceeds a threshold in a period of time, then deleting said URL from the blacklist.

Figure 5:
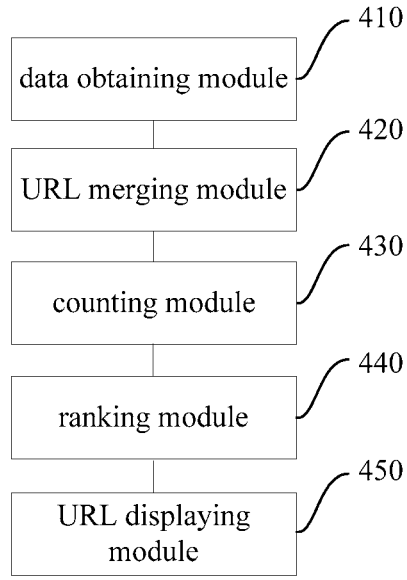
FIG. 5 is a structural diagram of a second embodiment of the device for generating a URL navigation page according to the present invention.

FIG. 5 is a structural diagram of a second embodiment of the device for generating a URL navigation page according to the present invention, said device comprises:

a data obtaining module 410 adapted to obtaining a user's URL browsing record;

a URL merging module 420 adapted to merging URLs related to the list of merged URLs in said record according to the list of merged URLs;

a counting module 430 adapted to counting the visit frequency of the merged URLs and the URLs that are not in the list of merged URLs;

a ranking module 440 adapted to ranking each of the URLs based on the counted frequency of visit to each of the URLs by the user;

a URL display module 450 adapted to putting the top several URLs in the rank into specified positions to be displayed.

Wherein, before said URL displaying module, there are also:

a counting sub-module adapted to counting the number of times of visiting and/or the way of visiting each URL according to said record;

a ranking sub-module adapted to ranking multiple URLs according to the counted number of times of visiting and/or the way of visiting each of said multiple URLs.

Wherein, after said counting module, there is also an updating module for the list of merged URLs, which adapted to, when the visit frequency of a URL exceeds a threshold, adding said URL to the list of merged URLs.

Wherein, after said ranking module, there are also a URL deleting module adapted to deleting blacklist URLs among the ranked URLs according to a blacklist, and a blacklist removing module adapted to, for URLs in the backlist set by the user, if the frequency of visit to a certain URL by the user exceeds a threshold within a period of time, then deleting said URL from the blacklist.

Figure 6:
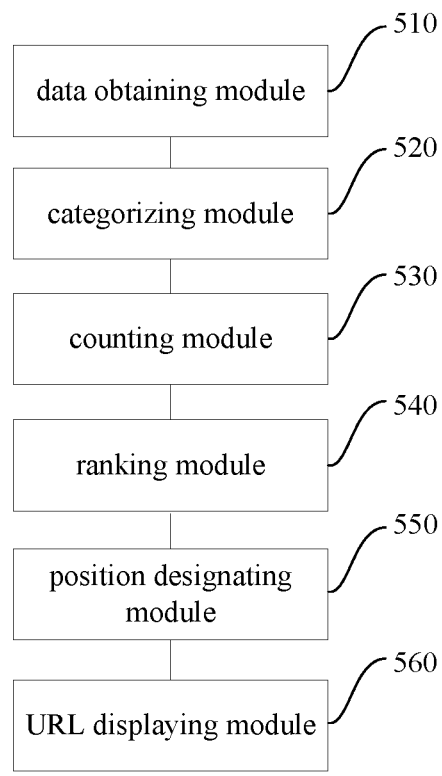
FIG. 6 is a structural diagram of a third embodiment of the device for generating a URL navigation page according to the present invention.

FIG. 6 is a structural diagram of a third embodiment of the device for generating a URL navigation page according to the present invention, said device comprises:

a data obtaining module 510 adapted to obtaining a user's URL browsing record;

a categorizing module 520 adapted to categorizing the URLs in said record according to a URL categorization rule;

a counting module 530 adapted to counting the frequency of visit to each category of URLs according to said record;

a ranking module 540 adapted to ranking each of the categories of URLs based on the counted frequency of visit to each category of URLs by the user;

a position designating module 550 adapted to selecting URLs of the top several categories of URLs in the rank and designating them into specified positions;

a URL displaying module 560 adapted to selecting, according to a categorization rule, URLs in each category of URLs to which positions have been designated and putting them in corresponding positions to be displayed.

Wherein said counting module includes:

a first counting module adapted to counting the visit frequency of each URL according to said record;

a second counting module adapted to accumulating the visit frequency of URLs in each category according to the visit frequency of each URL to obtain a total visit frequency of each of the categories.

Wherein, after said categorizing module, there is also a category adding module adapted to, when the total frequency of visit to URLs related to an event by all clients exceeds a threshold, adding said event into the categorization rule as a new category.

After said categorizing module, there is also a URL merging module adapted to merging URLs related to the list of merged URLs in each of the categories of URLs according to the list of merged URLs.

Wherein, preferably, the URL displaying module is adapted to displaying the top one or several URLs in the rank in each of the categories of URLs in corresponding positions according to the rank of the visit frequency of each URL in said categories of URLs.

Wherein, before said URL displaying module, there are also:

a counting sub-module adapted to counting the number of times of visiting and/or the way of visiting each URL according to said record;

a ranking sub-module adapted to ranking multiple URLs according to the counted number of times of visiting and/or the way of visiting each of said multiple URLs.

Wherein, after said counting module, there is also an updating module for the list of merged URLs, which adapted to, when the visit frequency of a URL exceeds a threshold, adding said URL to the list of merged URLs.

Wherein, after said ranking according to the visit frequency of each URL in the categories of URLs, there are also a URL deleting module adapted to deleting blacklist URLs among the ranked URLs according to a blacklist, and/or a blacklist removing module adapted to, for URLs in the backlist set by the user, if the frequency of visit to a certain URL by the user exceeds a threshold within a period of time, then deleting said URL from the blacklist.

The device embodiments are substantially similar to the method embodiments, so they are described in a relatively simple manner, as for relevant details thereof, reference can be made to the descriptions about the method embodiments.

The embodiments in this specification are described in a progressive manner, and in each embodiment, its difference from other embodiments are emphasized, while as for the same or similar portions of the embodiments, cross reference can be made to the embodiments.

Each of the component embodiments in the present invention can be implemented by hardware by or software modules operating on one or more processors, or by combinations thereof. Those skilled in the art shall understand that microprocessors or digital signal processors (DSP) may be used in practice to realize some or all functions of some or all components in the device for generating a URL navigation page according to the embodiments of the present invention. The present invention can also be implemented as a device or apparatus program (e.g. computer program and computer program product) for carrying out a part or the entirety of the method described herein. Such a program for implementing the present invention can be stored on a computer-readable medium or it can be in the form of one or more signals. Such signals can be downloaded from an Internet web site or be provided on a carrier signal, or be provided in any other forms.

Figure 7:
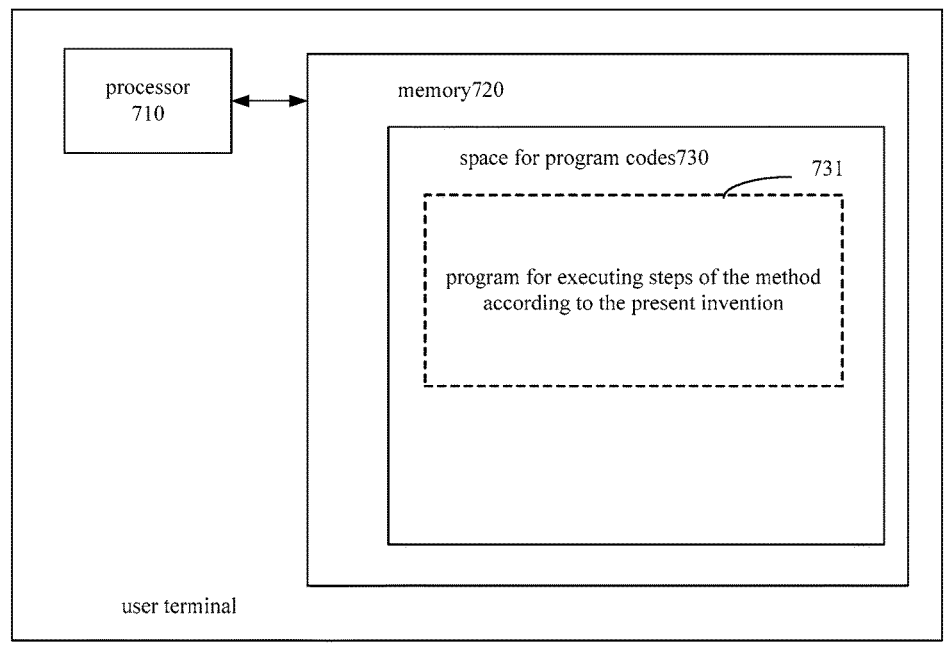
FIG. 7 is a block diagram of the user terminal for carrying out the method according to the present invention.
Figure 8:
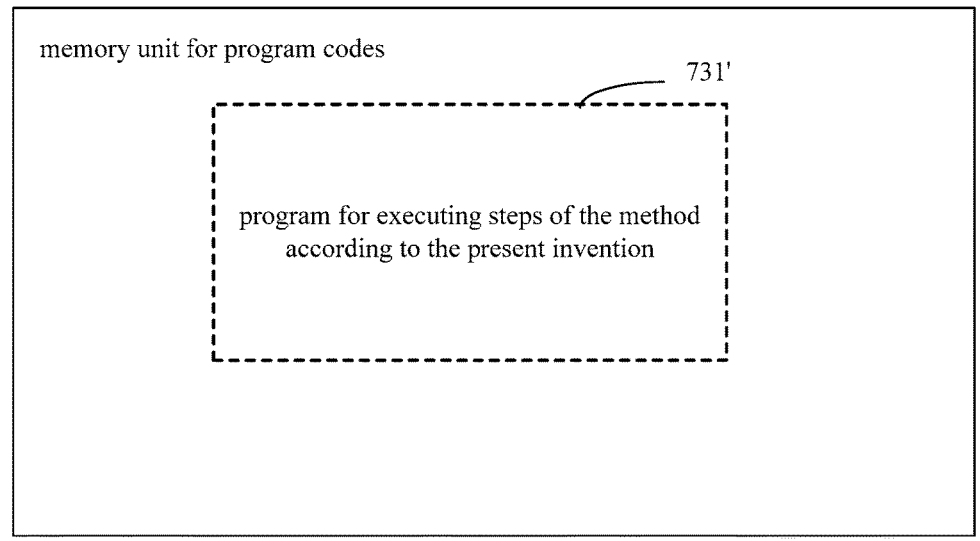
FIG. 8 is a schematic drawing of a memory unit for keeping or carrying the program code that carries out the method according to the present invention.

For example, FIG. 7 shows a user terminal for carrying out the method for generating a URL navigation page according to the present invention. Said user terminal conventionally comprises a processor 710 and a computer program product or a computer readable medium in the form of a memory 720. The memory 720 can be an electronic memory such as flash memory, EEPROM (Electrically Erasable Programmable Read Only Memo), EPROM, hard disk or ROM. The memory 720 has a memory space 730 for a program code 731 for carrying out any method step of the above-mentioned method. For example, the memory space 730 for the program code may include various program codes 731 for realizing each of the steps in the above-mentioned method. Said program codes can be read from one or more computer program products or be written into said one or more computer program products. Said computer program products include such program code carrier as hard disk, compact disk (CD), memory card or soft disk. Such a computer program product is usually a portable or fixed memory unit as described with reference to FIG. 8. Said memory unit may have a memory section, a memory space, etc. arranged in a similar manner as the memory 720 in the user terminal of FIG. 7. The program code can be compressed, for example, in an appropriate manner. Usually, the memory unit includes computer readable codes 731', i.e. codes that can be read by such processor as 710, and said codes, when being run by a user terminal, cause the user terminal to carry out the steps in the above described method.

The "one embodiment", "embodiment" or "one or more embodiments" mentioned in this document means that specific features, structures or characteristics described in conjunction with the embodiment are included in at least one embodiment of the present invention. In addition, it shall be noted that such wording as "in one embodiment" does not necessarily mean the same one embodiment.

In this specification, a lot of specific details are provided. But it shall be understood that the embodiments of the present invention can be implemented without these specific details. In some examples, the known methods, structures and techniques are not described in detail so as not to confuse understanding to this specification.

It shall be noted that the above embodiments are to illustrate instead of limiting the present invention, and those skilled in the art can design substitute embodiments without departing from the scope of the attached claims. In the claims, any reference sign placed in parentheses should not be construed as limiting the claims. The word "comprise" does not intend to exclude the existence of elements or steps that are not mentioned in the claims. The word "a" or "an" placed before an element does not intend to exclude the existence of a multiple of such element. The present invention can be implemented by means of a hardware including several different elements and by means of an appropriately programmed computer. In a device claim that lists multiple modules, several of these modules can be specifically implemented through the same hardware element. The use of words like first, second and third does not indicate any sequence, and they can be considered as nouns.

In addition, it shall be noted that the languages used in this specification are chosen for the purposes of readability and teaching, but not for explaining or limiting the subject matter of the present invention. Therefore, without departing from the scope and spirit of the attached claims, many modifications and changes are obvious to those ordinarily skilled in the art. As for the scope of the present invention, the disclosure of the present invention is illustrative instead of restrictive, and the scope of the present invention is defined by the attached claims.

The invention claimed is:

1. A method for generating a URL navigation page, said method comprising:
    obtaining a user's URL browsing records;
    merging records associated with visiting a URL that is related to a first URL included in a list of merged URLs under records of visiting the first URL, wherein the list of merged URLs is pre-installed together with a browser installation file, and wherein the list of merged URLs is updated by adding a second URL into the list of merged URLs when a visit frequency of the second URL exceeds a predetermined threshold;
    counting frequencies of visit to URLs included in the list of merged URLs and other URLs that are not related to any URL included in the list of merged URLs;
    ranking each of the URLs included in the list of merged URLs and the other URLs that are not related to any URL included in the list of merged URLs based on counted frequencies of visit to each of them by the user;
    displaying top several URLs in specified positions to be displayed.

2. The method according to claim 1, wherein
for all visits to a URL made by a user within a certain period of time, the frequency is recorded as a certain value.

3. The method according to claim 1, wherein
prior to a displaying step, further comprising:
    step A1: counting the number of times of visiting and/or the way of visiting each URL according to said record;
    step A2: ranking the URLs according to the counted number of times of visiting and/or way of visiting each of the URLs.

4. The method according to claim 1, wherein
a displaying step specifically comprising:
    putting the top several URLs in a rank into a plurality of positions in a tab page according to a sequence in the rank.

5. The method according to claim 1, wherein
following a ranking step, further comprising:
    deleting a third URL from ranked URLs according to a blacklist, wherein the third URL is included in the blacklist; and
    removing a fourth URL from the blacklist when a frequency of visit to the fourth URL by the user exceeds a threshold within a period of time.

6. A method for generating a URL navigation page, said method comprising:
    obtaining a plurality of URLs from a user's URL browsing record;
    categorizing the plurality of URLs according to a URL categorization rule;
    merging a URL among the plurality of URLs that is related to a first URL included in a list of merged URLs under the first URL, wherein the list of merged URLs is pre-installed together with a browser installation file, and wherein the list of merged URLs is updated by adding a second URL into the list of merged URLs when a visit frequency of the second URL exceeds a predetermined threshold;
    counting frequencies of visit to each category of URLs according to said record;
    for ranking each of the categories of URLs based on counted frequencies of visit to each category of URLs by the user;
    selecting URLs of top several categories of URLs and designating them into specified positions;
    selecting, according to a rule, URLs in each category of URLs to which positions have been designated and displaying them in corresponding positions to be displayed.

7. The method according to claim 6, wherein a counting step comprises:
    step S1: counting the frequency of visit to each URL according to said record;
    Step S2: accumulating the frequency of visit to URLs in each category according to the visit frequency of each URL to obtain a total visit frequency of each category.

8. The method according to claim 7, wherein
for all visits to a URL made by a user within a certain period of time, the frequency is recorded as a certain value.

9. The method according to claim 6, wherein a position designating step comprises:

according to the result of ranking of the categories of URLs, designating each of the top categories of URLs in the rank with a position in the tab page; or based on the proportion of the visit frequency of each category of URLs, correspondingly designating a plurality of positions in the tab page according to a rule.

10. The method according to claim 6, further comprising:
when a total frequency of visit to URLs related to an event by all clients exceeds a threshold, said event is added into the categorization rule as a new category.

11. The method according to claim 6, wherein, in a displaying step,
for each of said categories of URLs, according to a rank of visit frequency of each of the URLs in said categories of URLs, the top one or several in the rank are put into corresponding positions to be displayed.

12. The method according to claim 11, wherein
before said displaying step, further comprising
step A1: counting the number of times of visiting and/or the way of visiting each URL according to said record;
step A2: ranking the URLs according to the counted number of times of visiting and/or way of visiting each of the URLs.

13. The method according to claim 6, wherein
following said ranking, further comprising
deleting step for deleting a third URL from ranked URLs according to a blacklist, wherein the third URL is included in the blacklist; and removing a fourth URL from the blacklist when a frequency of visit to the fourth URL by the user exceeds a threshold within a period of time.

14. A computer readable medium, which stores the computer program comprising computer readable codes, and running of said computer readable codes on a user terminal causes said user terminal to carry out a method for generating a URL navigation page, said method comprising:
obtaining a plurality of URLs from a user's URL browsing record;
merging a URL among the plurality of URLs that is related to a first URL included in a list of merged URLs under the first URL, wherein the list of merged URLs is pre-installed together with a browser installation file, and wherein the list of merged URLs is updated by adding a second URL into the list of merged URLs when a visit frequency of the second URL exceeds a predetermined threshold;
counting frequencies of visit to URLs included in the list of merged URLs and other URLs that are not related to any URL included in the list of merged URLs;
ranking each of the URLs included in the list of merged URLs and the other URLs that are not related to any URL included in the list of merged URLs based on counted frequencies of visit to each of them by the user;
displaying top several URLs in specified positions to be displayed.

* * * * *